United States Patent [19]

Schatz et al.

[11] Patent Number: 4,949,681
[45] Date of Patent: Aug. 21, 1990

[54] METHOD FOR POSTCHARGING AN IC ENGINE OF THE PISTON TYPE AND AN APPARATUS FOR PERFORMING THE METHOD

[75] Inventors: Oskar Schatz, Waldpromenade 16, D-8035 Gauting; Thomas Steidele, Munich, both of Fed. Rep. of Germany

[73] Assignee: Oskar Schatz, Fed. Rep. of Germany

[21] Appl. No.: 444,558

[22] Filed: Nov. 30, 1989

Related U.S. Application Data

[63] Continuation of Ser. No. 267,087, Nov. 4, 1988, Pat. No. 4,890,582.

[30] Foreign Application Priority Data

Nov. 6, 1987 [DE] Fed. Rep. of Germany ....... 3737826

[51] Int. Cl.⁵ .............................................. F02B 17/00
[52] U.S. Cl. .................................... 123/26; 123/52 MF
[58] Field of Search ................ 123/26, 52 MF, 65 B, 123/65 BA, 59 AL, 80 BA, 52 MB, 559

[56] References Cited

U.S. PATENT DOCUMENTS

| | | | |
|---|---|---|---|
| 2,337,982 | 12/1943 | Ericson | 123/52 MF |
| 3,167,059 | 1/1965 | Love | 123/52 MF |
| 3,935,842 | 2/1976 | Ishizawa et al. | 123/52 MF |
| 4,030,459 | 6/1977 | Hori et al. | 123/52 M |
| 4,149,493 | 4/1979 | Franke | 123/26 |
| 4,240,387 | 12/1980 | Motosugi et al. | 123/52 MB |
| 4,465,034 | 8/1984 | Tsutsumi | 123/52 M |
| 4,515,127 | 5/1985 | Katsuoka | 123/80 BA |

FOREIGN PATENT DOCUMENTS

| | | | |
|---|---|---|---|
| 3711859 | 10/1987 | Fed. Rep. of Germany | 123/73 B |
| 0147531 | 8/1985 | Japan | 123/52 M |
| 0139929 | 6/1987 | Japan | 123/52 M |

Primary Examiner—David A. Okonsky
Attorney, Agent, or Firm—Harness, Dickey & Pierce

[57] ABSTRACT

In order to postcharge an IC engine of the piston type during the piston motion in the vicinity of the lower dead center position in addition to the charge drawn in from an individual duct (17) via an induction valve (42) charge compressed by a charger is introduced from a pressure duct (19) via a pressure valve (28) from a charger into an inlet duct (21) leading to the inlet valve (11) of the combustion chamber, the opening phase of the pressure valve (28) and the closing phase of the induction valve (42) overlap and then a pulse exchange takes place towards the combustion chamber between the induction and pressure flows. For this purpose the connection between the induction and the pressure ducts is preferably designed in the manner of a suction jet pump pumping into the combustion chamber.

20 Claims, 4 Drawing Sheets

METHOD FOR POSTCHARGING AN IC ENGINE OF THE PISTON TYPE AND AN APPARATUS FOR PERFORMING THE METHOD

This is a continuation of U.S. patent application Ser. No. 267,087, filed Nov. 4, 1988, now U.S. Pat. No. 4,890,582.

The invention relates to a method for the postcharging of an IC engine of the piston type in the case of which prior to the end of inlet into the combustion chamber to be charged in addition to the charge, which is drawn in via an induction duct, during the piston motion in the vicinity of the lower dead center position charge compressed by a charger is introduced from a pressure duct via a pressure valve into a inlet duct leading into the combustion chamber and connected with the induction duct via an induction valve, and to an apparatus for performing the method.

The operation of IC engines in connection with a compressor designed as a charger for compression of the charged air to be introduced into the combustion chamber or of the fuel air mixture, use has not only been made of so-called supercharging in which the compressed charge flows into the combustion chamber to be charged during the entire time the inlet valve is open but also of so-called postcharging, in which initially uncompressed charge is drawn in and it is only towards the time at which the inlet is closed that compressed charge is introduced into the combustion chamber in addition.

In order to improve the efficiency there is a desire to only have to provide minimum of drive energy for the required charge pressure.

This is made possible in the case of postcharging if the engine draws in as much air as possible, something that means that the induced flow has to be continued as long as possible and that transfer of energy from the compressed air to the engine piston is avoided as far as possible, something that again means that the compressed air has to enter as late as possible. It is thus desirable when the supply of compressed air is started that the induced air flow until the compressed air flow has been fully established.

Apart from the case of direct postcharging, in which the compressed charge is expelled by a charger driven mechanically in accord with the piston motion of the combustion chamber prior to the end of inlet into the combustion chamber, the compressed charge is discharged by a control valve, which is operated in accordance with the ignition frequency of the engine prior to the end of inlet into the combustion chamber, while at the same time escape of the compressed charge via the induction duct has to be prevented.

The object of the invention is to devise a method of the initially mentioned type so that there is the best possible torque function and in particular the most optimum postcharging, that is to say a given terminal charge pressure is achieved with minimum expenditure of energy. For this purpose there is more especially to be the aim of causing the flow to take place with as little irregularity as possible and to keep pressure losses low. At the beginning of the postcharging the induction flow is to be continued until the pressure flow has become fully established. Furthermore there is to be a possibility of making optimum use of the pressure increase owing to back pressure effects during the slowing down of the induction and pressure flows in the connection space.

Lastly by having a suitable design of an apparatus for performing the method there is to be a reduction of the dead spaces to a minimum between the control valve and the engine inlet valve and to make possible the use of resonant phenomena in the duct system upstream from the control valve in order to improve charging in the combustion chamber.

In order to achieve this object the initially mentioned method is so developed that the opening phase of the pressure valve and the closing phase of the induction valve overlap and during this time there is a pulse exchange towards the combustion chamber between the induction and pressure flows.

This measure means that induced flow still occurring on opening the pressure valve will have an accelerating effect on the pressure flow beginning to take place, and for its part such pressure flow will, as soon as its velocity has correspondingly increased, release a pulse flow to the induced flow prior to closing of the induction valve. This ensures that the induced flow is kept up as long as possible and that the compressed air will flow into the combustion chamber near the dead center position shortly before inlet ceases.

In order to perform this method the zone in which an induction duct to be closed by an induction valve and a pressure duct to be closed by a pressure valve join together to form an inlet duct leading to at least one combustion chamber of an IC engine of the piston type is designed in accordance with the invention in the form of a suction jet pump.

In accordance with a convenient development the induction valve may be in the form of a valve responding to pressure differences so that it operates automatically.

In this respect one possible design is such that the induction valve is in the form of a valve flap, which under the action of a restoring force assumes its neutral position in which it shuts off the induction duct.

In accordance with another highly advantageous form the induction valve is designed as a valve lug, whose upstream end is so pivotally mounted in the connection between the induction and pressure ducts that in one terminal position it shuts off induction duct in the other terminal position it completely clears its cross section, it being convenient as a further feature if under the action of a restoring force the valve lug closes the pressure duct in its other terminal position, serving as the neutral position.

Preferably this range is designed as an apparatus in the form of a control valve unit operated in accordance with the piston motion of the engine.

In this respect one convenient development of the invention is such that in the case of an apparatus with a valve housing having three duct connections and in which a rotor is arranged which is able to turn about an axis, serves as an obstructing member and has a valve port extending through it, an induction and a pressure duct extending respectively from one of the duct connections join together at an acute angle to form an outlet duct leading to the third duct connection, and the rotor extends through the induction and pressure ducts and the cross section of the valve port is so selected that during the rotation of the rotor the valve port is connected in sequence with the induction duct, then simultaneously with the induction and pressure ducts and lastly with the pressure duct.

In this design in accordance with the rotation of the rotor firstly the induction duct is connected wiht the inlet duct, whereupon with the induction duct still open the pressure duct is connected with the inlet duct and at this time the charge passing through the valve port in the rotor and supplied under pressure exerts an aspirating effect on the charge located in the induction duct so that on transition from the induction phase to the postcharging phase there is an exchange of pulses between the drawn in charge and the charge supplied under pressure, that is to say the respectively more rapid part of the charge entrains the slower part until finally the induction duct and the pressure duct as well are closed. The result is a prolongation of the induction phase which may in some cases even lead to overlap with the postcharging phase.

Owing to the acute angle at the junction of the induction and the pressure ducts, in the case of which the angle may be made so small as may be allowed by mechanical design requirements, it is possible to ensure that the flow path through the control valve is as straight as possible, this leading not only to a minimum of resistance to flow but also the possibility of the use of backpressure effects in the ducts on retarding the gas column and of reasonant effect. Since the inlet duct between the apparatus in accordance with the invention and the inlet valve of the combustion chamber to be charged may be made extremely short, there is furthermore the possibility of making the dead space upstream from the combustion chamber very small in size.

In accordance with an advantageous development of the invention the rotor is has a cylindrical design and its axis runs transversely in relation to the direction of flow through the valve, the rotor extends through the connection between the induction and pressure ducts and the inlet cross section of the valve port is so large that during the connection of the outlet cross section of the valve with the outlet duct the valve port is successively connected with the induction duct, that simultaneously with the induction and pressure ducts and lastly with the pressure duct.

Another advantageous form is such that the rotor has an eccentric part of its cross section penetrating the connection between the induction and the pressure ducts and the valve port as an eccentric passage divides the rotor cross section to two unequal segments, the valve port tapering in the direction of rotation of the rotor while its inlet flow cross section becomes larger in the direction of flow therethrough and its outlet cross section on the other hand becomes larger that the rib width between the induction and the pressure ducts at the outlet port of the induction and pressure ducts into the rotor.

Owing to the eccentric arrangement of the valve port in the rotor the connection between the induction duct and the pressure duct on the one hand and on the other hand the inlet duct leading to the combustion chamber of the engine is only opened once per revolution of the rotor is that the speed of the rotor is doubled and thus the complete port cross section is reached correspondingly faster.

A still further development of the invention is such that an induction and a pressure duct respectively extending from one of the duct connections join together as an outlet duct leading to the third duct connection and the pressure duct is able to be shut off just upstream of the connection between the induction and the pressure ducts by the rotor and in the induction duct just upstream of the connection between the induction and pressure ducts there is a valve which temporarily shuts off the induction duct.

In this design the induction valve automatically opens when vacuum is produced in the inlet duct. This is the case for instance at the beginning of the induction phase of the combustion chambers. The postcharging phase is started when the rotor opens the connection between the pressure duct with the inlet duct. Then there is firstly a pulse exchange between the flow of the drawn in charge and the flow of the charge being supplied under pressure as long as the flows are moving alongside each other into the inlet duct. Owing to the lamellar arrangement of the check valve the latter is opened by the venturi effect as long as the pressure flow is capable of maintaining a vacuum in the connection, such vacuum maintaining the drawn in flow.

The utility of the exchange pulses is the greater the smaller the angle between the drawn in flow and the pressure flow. Preferably, the induction duct and the pressure duct thus come together at an acute angle.

Preferably the rotor is made cylindrical and the rotor axis extends perpendicularly to the direction of flow through the valve, it furthermore being preferable for the valve port to be in the form of a duct extending in the chordal direction.

In accordance with a further useful development the rotor has an eccentric part of its cross section extending through the pressure duct and the valve port is in the form of a rotor cutout which is of segment shape in relation to the rotor cross section.

The eccentric arrangement of the valve port in the rotor means that the pressure duct may be placed very close to the connection between the pressure and induction ducts and thus the dead space is kept as small as possible and at the same time it is possible to have a very small acute angle between the two uniting ducts. Furthermore, as already indicated, the connection between the induction duct and the pressure ducts on the one had and the inlet duct leading to the combustion chamber of the engine on the other hand is only opened once for each rotation of the rotor so that the speed of rotation of the rotor is doubled and thus the full port cross section is reached correspondingly more rapidly.

In accordance with a further useful development of the invention the outlet duct extends at least approximately in the same direction as the pressure duct in order to minimize the resistance to flow.

As already noted the invention is also more particularly suitable as a way of utilizing dynamic effects in order to achieve the desired terminal charge pressure. There is thus a further useful development of the invention in which upstream from the induction valve and/or the pressure duct upstream from the pressure valve is designed as a resonant tube or resonant rest.

In accordance with a particularly advantageous form of the invention in the case of a resonant tube or resonant device the speeds to which these devices are tuned are different in the induction and pressure ducts. As a result it is possible to achieve a particularly full torque curve.

A further particularly advantageous design is one in which the rotor is able to have its phase adjusted in accordance with operational parameters of the engine in relation to the engine crank shaft. There is thus for instance the possibility of so adjusting the rotor at high speeds of rotation that during opening of the engine inlet valve only the pressure duct is connected with the inlet duct in order to change over from postcharging to charging.

Working embodiments of the invention will now be described with reference to the drawing.

Figure 1:
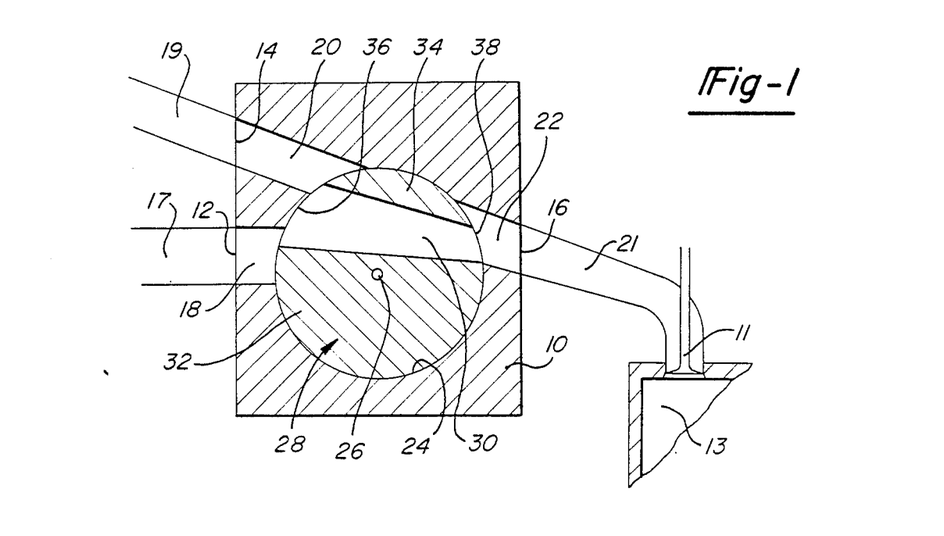
FIG. 1 is a diagrammatic view of the air inlet duct of an IC engine with a section taken through a first embodiment of the device in accordance with the invention.

The control valve 1 shown in FIG. 1 consists of a valve housing 10 with three air duct connections 12, 14 and 16, of which the duct connection 12 is intended for connection with an induction duct 17, the duct connection 14 is intended for connection with a pressure duct 19 and the duct connection 16 is intended for connection with an inlet duct 21 leading to the inlet valve 11 of a combustion chamber 13 of an IC engine. The duct connections 14 to 16 are connected via ducts 18, 20 and 22 with a cylindrical chamber 24 formed in the valve housing 10. In this chamber 24 there is a cylindrical rotor 28, serving as an obstructing member and able to be driven for rotation about an axis 26. A duct 30, serving as a valve opening, extends through the rotor in the chordal direction. The ducts 18 through 22 are so arranged in the valve housing 10 that the induction 18 and the pressure duct 20 extend towards the chamber 24 with an acute angle between them. An outlet duct 22 leading to the duct connection 16 extends from the chamber 24 generally along a line prolonging the pressure duct 20 so that when the rotor 28 is suitably positioned a generally linear connection between the pressured duct 20 and the outlet duct 22 may come into existence in order to reduce the resistance to flow to a minimum.

The chamber 24 is in the connection between the three ducts 18 through 22, the point of intersection of the three ducts 18 through 22 being arranged eccentrically in relation to the axis 26 of the chamber 24. This eccentric arrangement means that the duct, serving as a valve port, is arranged eccentrically in the rotor 28 so that it divides up the cross section of the rotor 28 into a large segment 32 and a small segment 34. This eccentric arrangement offers the advantage that there is only an opening of the valve after each full revolution of 360° so that as compared with a rotor with an opening produced respectively after 180° there is twice the rotor speed and therefore the full opening cross section will be more rapidly achieved.

Owing to the opening of the valve taking place respectively after each 360° the duct 30 has an inlet cross section with an inlet cross section 36 and an outlet port with an outlet cross section 38, the cross section of the duct 30 decreasing from the inlet cross section 36 as far as the outlet cross section 38.

In the case of the position of the rotor 28 shown the compressed air flows from the pressure duct 20 via the duct 30 in the rotor 28 the outlet duct 22, the duct 30 and thus also the outlet duct 22 simultaneously connected with the induction duct 18 so that the respectively more rapid part of the charge is able to entrain the slower part. In the case of the assumed direction of rotation of the rotor 28 in the clockwise direction there is firstly a connection produced between the induction duct 18 and the outlet duct 22 prior to the creation of a common connection of the induction duct 18 and of the pressure duct 20 with the outlet duct 22. On continued rotation of the rotor finally the connection with the induction duct 18 is interrupted and only the pressure duct 20 is connected with the outlet duct 22. As will be seen from FIG. 1, the inlet cross section 36 of the duct 30 in the circumferential direction of the rotor 28 will have to be made sufficiently larger than the breadth of the rib 40, measured in the circumferential direction of the rotor between the induction duct and the pressure duct.

When the rotor 28 continues its rotation after the closing of the pressure duct 20, the outlet cross section 38 will finally come into the part adjacent to the induction duct 18, the rib 40 and of the pressure duct 20. On moving through this sector the inlet cross section 36 is not connected with the outlet duct 22 so that the valve maintains its blocking action. It is however necessary to ensure that no connection is produced via the outlet cross section 38 between the induction duct 18 and the pressure duct 20, which might lead to a pressure loss in the pressure duct. For this reason the outflow cross section 38 is made narrower than the breadth of the rib 40.

Figure 2:
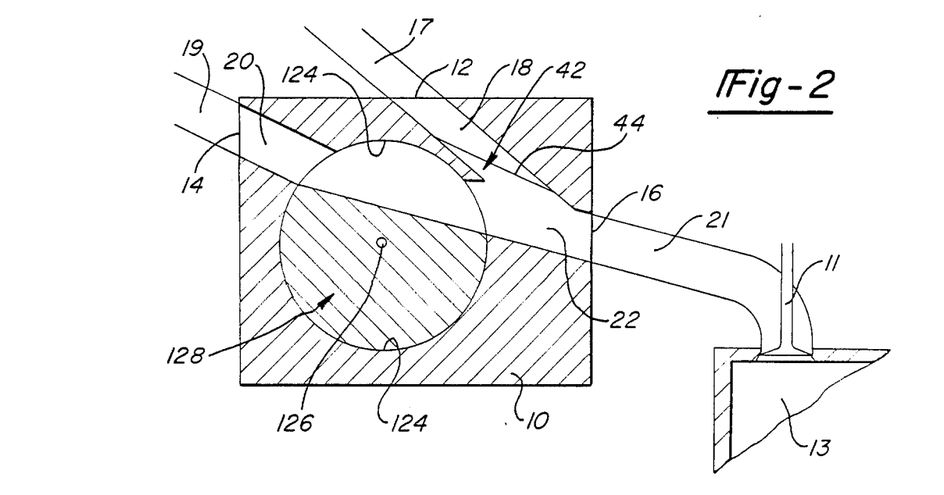
FIG. 2 is a view generally similar to that of FIG. 1 with a second embodiment of the device.

The device shown in FIG. 2 as well consists of a valve housing 10 with three duct connections 12, 14 and 16, of which the duct connection 12 is intended for connection with the induction duct 17, the duct connection 14 is intended for connection with the pressure duct 19 and the connection 16 is intended for connection with the inlet duct 21 leading to the inlet duct 11 of a combustion chamber 13 of the IC engine. A pressure duct 20 leads from the duct connection 14 to a cylinder chamber 124 formed in the valve housing 10 and in the chamber a cylindrical rotor 128 is mounted so that it may be turned, it serving as an obstructing body and having a duct 130, serving as a valve port, passing through it. An outlet duct 22 adjoins the chamber 124 and leads into the flow direction to the duct connection 16. In the duct 22 there opens an induction duct 18 directly after the chamber 124 and it is connected with the duct connection 12. The pressure duct 20 and the outlet duct 22 are so arranged that in the open setting of the rotor 128 there is the straightest possible flow path for the charge which is under pressure. For the same reason the induction duct 18 opens at the smallest possible angle into the outlet duct 22. This is facilitated in as far as the axis 126 of the chamber 124 and of the rotor 128 is offset towards the side remote from the induction duct 18 in relation to the pressure duct 20. This eccentric arrangement of the chamber 124 in relation to the pressure duct 20 also means that the duct 120 is eccentrically arranged in the rotor, such duct being in the form of a segment-like cutout.

Owing to the eccentric arrangement of the duct 130 the opening of the pressure duct 20 takes place only once during each full rotation of the rotor so that a rapid opening takes place uncovering the full cross section for flow therethrough.

The opening of the induction duct 18 into the outlet duct 22 is provided with an induction valve 42, which has a lamellar valve member 44. The member of the induction valve 42 opens automatically when there is vacuum in the outlet duct 22. This is for instance the case at the start of the induction phase, but also at the start of the postcharging phase, when the rotor 128 through the duct 130 frees the connection between the pressure duct 20 and the outlet duct 22 and the charge under pressure flows at a high speed part the port of the induction duct 18 into the outlet duct 22. In this case there is initially a pulse exchange between the drawn in flow and the pressure flow as long as the two flows pass alongside each other through the outlet duct 22.

The design of valve shown makes it possible to arrange the closing zone of the valve at a very small distance from the engine inlet valves so that the dead spaces may be kept very small in size. Furthermore flow through the valve with relatively small pressure losses is possible so that there is no impediment in the case of the use of resonant and backpressure effects in order to increase the terminal charging pressure.

Figure 3:
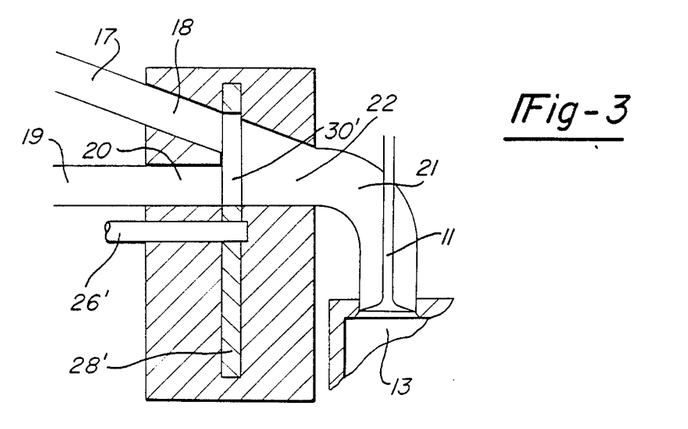
FIG. 3 shows a modified form of the device of FIG. 1.
Figure 4:
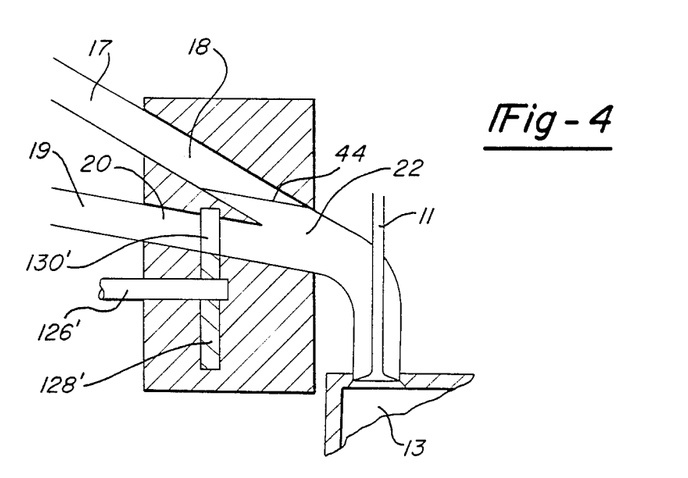
FIG. 4 shows a similar modified form of the device shown in FIG. 2.

In the case of the valve designs shown in FIGS. 1 and 2 the axis 26 or 126 of the rotor 28 or 128 extends in each case transversely in relation to the direction of flow through the valve and the rotor 28 and 128 it may cylindrical or in the form of a roller. In FIGS. 3 and 4 modifications of this will be seen in which there are rotors designed in the form of obstructing disks 28' and, respectively, 128' and which are able to rotate about axes 26' and, respectively, 126' running generally in the direction of flow through the valves. The valve ports 30' and, respectively, 130' are in the form of passages in the obstructing disks 28' and, respectively, 128', which extend over a sector corresponding to the intended operating characteristic.

Figure 5:
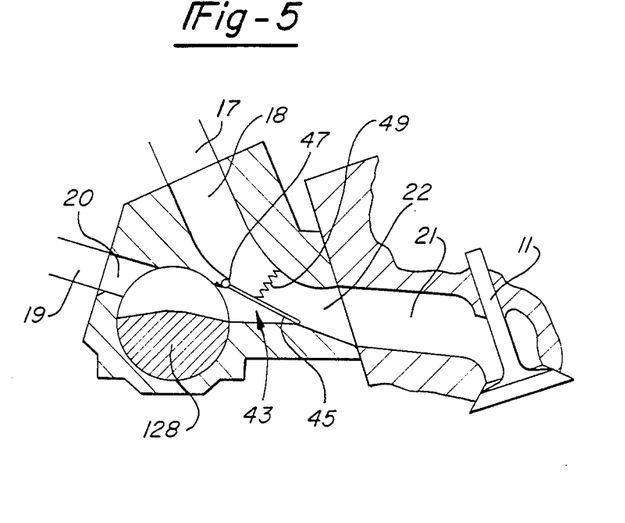
FIG. 5 shows a further form of the device of FIG. 2.

FIG. 5 shows a modification of the design in FIG. 2, which in a similar manner may also be realized in connection with the design of FIG. 4. In it the position of the induction valve 43 is modified, which has only one valve lug 45, which has its end 47, which in relation to the flow direction through the induction and pressure ducts 17 and, respectively, 19, is upstream pivoted at the apical point between the two ducts 18 and 20 joining at an acute angle, in such a manner that it assumes the neutral position shutting off the pressure duct 20 and which it assumes under the action of a spring 49, and may be pivoted from this neutral position into a terminal position shutting off the induction duct 18.

In its neutral setting the valve lug 47 uncovers the full cross section for the induction flow and in its other terminal position uncovers the full cross section for the pressure flow so that there are no choke effects. The pivoting into the terminal position shutting the induction duct is brought about by the pressure flow after opening the pressure duct 20 by the rotor 128.

Figure 6:
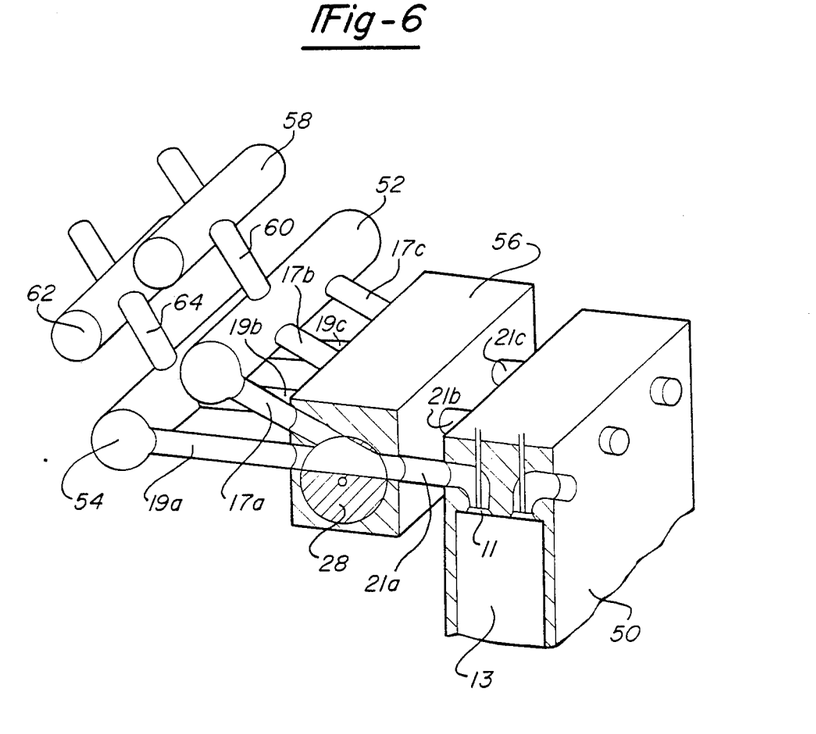
FIG. 6 is a diagrammatic and perspective view of the inlet system of a multicylinder; engine designed in accordance with the invention.

FIG. 6 diagrammatically represents a part, for instance of a six cylinder engine 50, to show the cylinders thereof. The part is supplied with charge at atmospheric pressure via an induction duct 52 and a charge under pressure by a charger, not shown, via a pressure duct 54. The individual enging cylinders are provided with inlet ducts 21a, 21b, 21c and 21d, which are supplied via control valves of one of the above explained designs with charge from the induction duct 52 and, respectively, the pressure duct 54. These control valves are united together as a block denoted 56 in FIG. 5, the rotors associated with the individual engine cylinders being offset in relation to each other at an angle in accordance with the ignition sequence.

Branch ducts 17a, 17b, 17c and 17d lead from the induction duct 52 and form the pressure duct 54 there extend branch ducts 19a, 19b, 19c and 19d to the control valves collected together in the block 56. The induction duct 52 is supplied via a resonant tube 60 and the pressured duct 54 is supplied from an equalization vessel 62 via an resonant tube 64. The length of the resonant tubes 60 and 64 is so set to two different resonant speeds of rotation that the resonance in the induction system and the resonance in the pressure system at different speeds of rotation aid in increasing the terminal charge pressure so that the torque curve of the engine becomes generally fuller.

We claim:

1. A method of postcharging a piston internal combustion engine, said engine including one or more combustion chambers, each combustion chamber including an inlet and a controller for controlling air entering the combustion chambers through the inlets, the controller coupled with an induction and a pressurized air source; said method comprising:

drawing air into said combustion chamber simultaneously from said induction air source and said pressurized air source such that an exchange of momentum between induction and pressure currents is propagating towards said combustion chamber.

2. An apparatus for postcharging an internal combustion engine comprising:

a housing including means adapted for coupling with an induction air source and with a pressurized air source and with a combustion chamber, and passage means including an induction duct, pressure duct and exhaust duct for enabling air to pass from both said air sources through said housing;

valve means in said passage means for opening and closing said induction and pressure ducts to enable air flow from said induction and pressurized air sources to pass through said air passage means to exit to said combustion chamber such that during opening and closing of said induction and pressurized ducts the opening and closing of the ducts is overlapped to enable simultaneous drawing of air from both the induction and pressurized air sources through said passage means to exit through said exhaust duct to said combustion chamber after having exchanged momentum between both air streams, always accelerating the slower one.

3. The apparatus as claimed in claim 2 characterized in that said valve means includes an induction valve (42 and 43) in the form of a valve responding to pressure differences.

4. The apparatus as claimed in claim 3, characterized in that the induction valve (42) is in the form of a valve flap which under the action of a restoring force assumes its neutral setting in which it shuts off the induction duct (18).

5. The apparatus as claimed in claim 3, characterized in that the induction valve (43) is in the form of a valve lug whose upstream end (45) is so attached in the connection part of the induction (18) and pressure ducts (20) that it may so pivot that in one terminal position it closes the induction duct (18) and in the other terminal position it completely frees the cross section thereof.

6. The apparatus as claimed in claim 5, characterized in that the valve lug (43) under the action of a restoring force (47) in its other end position, which is the neutral position, shuts off the pressure duct (20).

7. The apparatus as claimed in claim 2, characterized in that it is in the form of a control valve unit responding to the piston motion of the engine.

8. The apparatus is claimed in claim 7, comprising a rotor (28 and 28') arranged for rotation about a shaft to serve as said valve means and having a valve port (30) passing through it, characterized in that said induction duct (18) and a pressure duct (20) each extending from said induction and pressure coupling means to join together at an acute angle to form said exhaust duct (22) leading to the exhaust coupling means and in that the rotor (28 and 28') extends through the induction duct (18) and is so selected that the valve port is connected during rotation of the rotor (28 and 28') successively with the induction duct (18), then at the same time with the induction duct (18) and pressure ducts (20) and the cross section (36) of the valve port (30 and 30') is so selected that during the rotation of the rotor (28 and 28') the valve port is successively connected with the induction duct (18), then simultaneously with the induction (18) and pressure ducts (20) and lastly with the pressure duct (20).

9. The apparatus as claimed in claim 8, characterized in that the rotor (28) is cylindrical in design and its axis (26) runs transversely in relation to the direction of gas through the valve, in that the rotor (28) extends through the connection between the induction (18) and pressure (20) ducts and the inlet cross section of the valve port (30) is so large that during the connection of the outflow cross section of the valve port with the exhaust duct (22) the valve port is successively connected with the exhaust duct (22), then with the induction duct (18), then simultaneously with the induction (18) and the pressure (20) ducts and then lastly with the pressure duct (20).

10. The apparatus as claimed in claim 8, characterized in that the rotor (28) has an eccentric part of its cross section extending through the connection (24) between the induction (18) and pressure (20) ducts and the valve port (30) as an eccentric passage divides the rotor cross section into two unequal segments, the valve port (30) tapering in the direction of inlet flow and in the circumferential direction of the rotor (28) its inlet flow cross section is smaller than the rib breadth between the induction (18) and pressure (20) ducts at the opening of the induction and pressure ducts into the rotor (28).

11. The apparatus as claimed in claim 7 with a valve housing (10) having a rotor (128) able to turn about an axis and designed in the form of an obstructing member and having a valve port (30) extending through it, characterized in that an induction (18) and a pressure (18) duct respectively extending form said induction and pressure coupling means to join together as said exhaust duct (22) leading to the exhaust coupling means and in that the pressure duct (20) is able to be shut off directly short of the connection between the induction (18) and pressure (20) ducts by the rotor (128) and in that in the induction duct (18) directly short of the connection between the induction and pressure ducts (20) there is a valve (42) temporarily shutting off the induction duct.

12. The apparatus as claimed in claim 11, characterized in that the induction (18) and the pressure (20) ducts join at an acute angle.

13. The apparatus as claimed in claim 11, characterized in that the rotor (128) has a cylindrical design and the rotor axis (126) extends perpendicularly to the direction of flow through the valve.

14. The apparatus as claimed in claim 13, characterized in that the valve port (130) is designed in the form of a duct extending in the chordal direction.

15. The apparatus as claimed in claim 13, characterized in that the rotor (138') has an eccentric part of its cross section extending through the pressure duct (20) and the valve port (30') is designed in the form of a segmental rotor section in relation to the rotor cross section.

16. The apparatus as claimed in claim 8 or claim 12, characterized in that the rotor axis (26' and 126') extends generally perpendicular to the direction of flow through the valve and the rotor (28' and 128') is in the form of an obstructing disk having the valve port (30' and 130') extending through it.

17. The apparatus as claimed in claim 8, characterized in that the exhaust duct (22) extends at least approximately in the direction of the pressure duct (20).

18. The apparatus as claimed in claim 2, characterized in that upstream from the passage means is a resonant tube or resonant device (60 and 64).

19. The apparatus as claimed in claim 18, characterized in that in the case of a resonant tube or resonant devices (60 and 64) in the induction or pressure ducts the speeds of rotation of these systems are tuned differently in the induction and pressure ducts.

20. The apparatus as claimed in claim 8, characterized in that the rotor (28, 28' and 128') is able to be adjusted in a phase relationship with respect to the engine crank shaft in response to operational parameters of the engine.

* * * * *

UNITED STATES PATENT AND TRADEMARK OFFICE
CERTIFICATE OF CORRECTION

PATENT NO. : 4,949,681

DATED : August 21, 1990

INVENTOR(S) : Oskar Schatz and Thomas Steidele

It is certified that error appears in the above-identified patent and that said Letters Patent is hereby corrected as shown below:

On the title page:

Abstract, Line 4, "individual" should be --inducation--;

Col. 1, Line 16, "a" should be --an--;

Col. 2, Line 68, "wiht" should be --with--;

Col. 3, Line 31, delete "is" after rotor;

Col. 3, Line 49, "that" should be --than--;

Col. 4, Line 39, "had" should be --hand--;

Col. 5, Line 17, delete ";" after multicylinder;

Col. 5, Lines 40-41, "pressured" should be --pressure--;

Col. 5, Line 16, after "28" insert --into--;

Col. 5, Line 67, after "22" insert --being--;

Col. 6, Line 38, "cylinder" should be --clyindrical--;

Col. 7, Line 6, "part" should be --past--;

Col. 7, Line 22, "and" (second occurrence) should be --or--;

Col. 7, Line 22, after "may" insert --be--;

Col. 7, Line 54, "the" should be --three--;

Col. 7, Line 58, "enging" should be --engine--;

Col. 8, Lines 3-4, "pressured" should be --pressure--;

UNITED STATES PATENT AND TRADEMARK OFFICE
CERTIFICATE OF CORRECTION

PATENT NO. : 4,949,681

DATED : August 21, 1990

INVENTOR(S) : Oskar Schatz and Thomas Steidele

It is certified that error appears in the above-identified patent and that said Letters Patent is hereby corrected as shown below:

Col. 8, Line 5, "an" should be --a--.

Signed and Sealed this

Fourteenth Day of July, 1992

Attest:

DOUGLAS B. COMER

Attesting Officer

Acting Commissioner of Patents and Trademarks